United States Patent [19]
Ushikoshi

[11] Patent Number: 5,990,589
[45] Date of Patent: Nov. 23, 1999

[54] BRUSHLESS MOTOR HAVING CORE HOLDER MOUNTING TO BASE BOARD FORMING GAP FOR WIRE INSERTION

[75] Inventor: Isao Ushikoshi, Nagano, Japan

[73] Assignee: Kabushiki Kaisha Sankyo Seiki Seisakusho, Nagano, Japan

[21] Appl. No.: 08/990,463

[22] Filed: Dec. 15, 1997

[30]    Foreign Application Priority Data

Dec. 13, 1996  [JP]  Japan ................................. 8-333425

[51] Int. Cl.$^6$ ...................................................... H02K 5/00
[52] U.S. Cl. ............................ 310/90; 310/71; 310/194; 310/DIG. 6
[58] Field of Search .................................. 310/71, 67 R, 310/91, 194, 216, 217, 218, 254, DIG. 6

[56]    References Cited

U.S. PATENT DOCUMENTS

| | | | |
|---|---|---|---|
| Re. 34,001 | 7/1992 | Wrobel ........................................ | 310/71 |
| 4,633,110 | 12/1986 | Genco et al. .............................. | 310/71 |
| 5,173,628 | 12/1992 | Yoshida et al. ........................... | 310/71 |
| 5,519,271 | 5/1996 | Sakashita et al. ......................... | 310/71 |
| 5,747,908 | 5/1998 | Saneshige et al. ........................ | 310/91 |

*Primary Examiner*—Nestor Ramirez
*Assistant Examiner*—Tran N Nguyen
*Attorney, Agent, or Firm*—Sughrue, Mion, Zinn, Macpeak & Seas, PLLC

[57]    ABSTRACT

In a brushless motor (1), a stator base board (10) has three grooves (14) which are cut radially of a mounting hole (103). A core holder (32) holding a stator core (31) has three protrusions (33) which extend downwardly in the direction of the axis of the motor (1). Each of the protrusions (33) has a first engaging portion (331) having a width which is substantially equal to a width of the grooves (14), and a second engaging portion (332) which is semi-circularly protruded from the outer cylindrical surface of the first engaging portion (331). When each of the protrusions (33) is fitted in the respective cut portions (14), two gaps (34) are formed between the outer surfaces of the second engaging portion (332) and the inner surfaces of the cut portions (14). Through the gaps (34), coil terminals (351) are extended from the upper surface (102) of the stator base board (10) to the lower surface, and are then soldered to lands (43) of the wiring pattern.

3 Claims, 4 Drawing Sheets

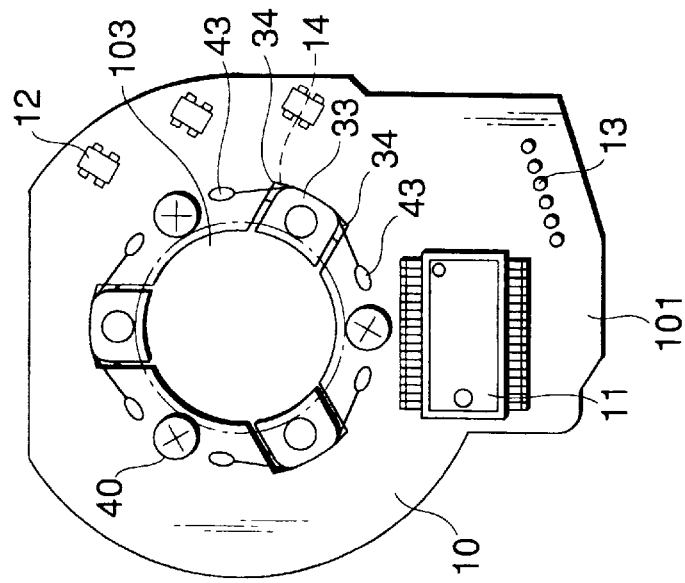
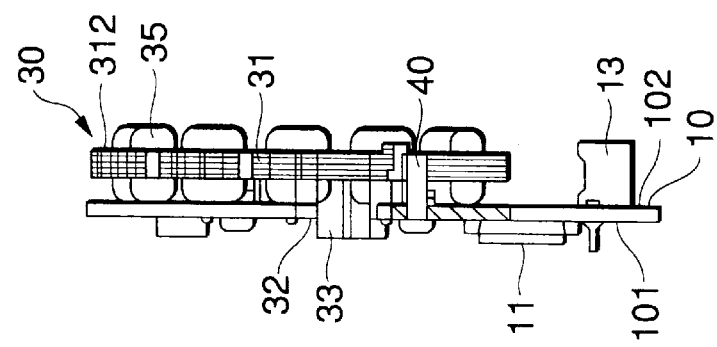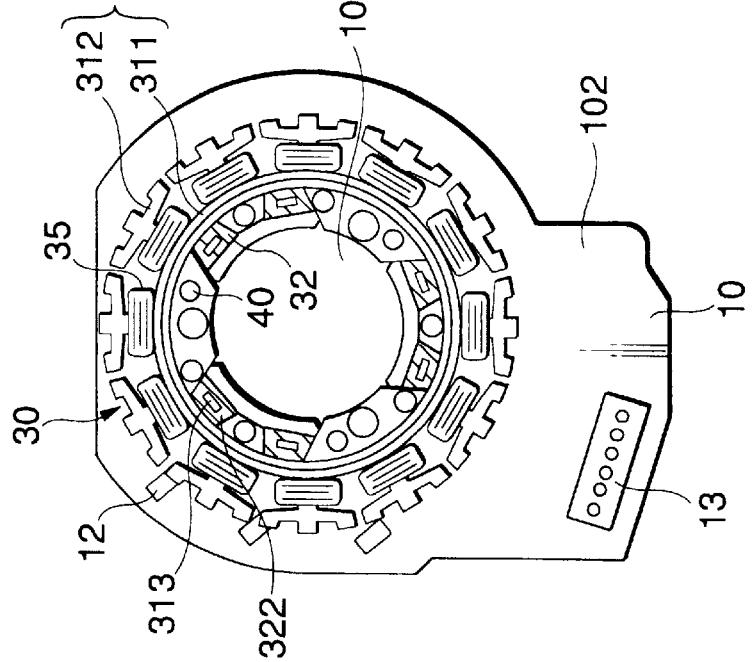

5,990,589

BRUSHLESS MOTOR HAVING CORE HOLDER MOUNTING TO BASE BOARD FORMING GAP FOR WIRE INSERTION

BACKGROUND OF THE INVENTION

1. Field of the Invention

This invention relates to a brushless motor, a typical example of which is a spindle motor for a video tape recorder (VTR), and more particularly to a coil terminal extending structure of extending the terminals of a coil from the front surface of a wiring board to the rear surface.

2. Related Art

In a brushless motor, the rotary position of the rotor is detected with a magnetic sensor, and according to the result of detection, a motor driving IC on the wiring board controls the supply of current to the drive coil. In general, on the front surface of the wiring board, a stator on which a plurality of phases of drive coils are wound is mounted, and the end portions of those drive coils are drawn out from the front surface of the wiring board to the rear surface, and connected to wiring patterns formed thereon. Therefore, heretofore, the terminal parts are disposed in a core holder holding the stator core, and the end portion of the coil are connected to the front side ends of the terminal parts, and the rear side ends of the terminal parts are wired to the wringing patterns.

Sometimes, without use of terminal parts, the end portion of the coils are directly connected to the wiring patterns. In this case, holes are formed in the wiring board, and the coil terminal parts are inserted in the holes thus formed, so that the coils are drawn out from the front surface of the wiring board to the rear surfaces. In another method, no such holes are formed in the wiring board, and after being laid outside of the printed circuit board, the coils are drawn out from the front surface of the wiring board to the rear surface.

In the case where, as was described above, the coils are connected to the wiring patterns through the terminal parts, the number of components is increased as much as the number of the terminal parts, and accordingly the resultant brushless motor is increased in manufacturing cost as much. Furthermore, in the case of use of the terminal parts, it is necessary to wire the end portions of the coil and lead wires to both ends of each of the terminal parts. Therefore, the manufacture of the brushless motor is low in work efficiency and in productivity.

In the case where holes are formed in the wiring board, and the end portions of the coil are inserted into the holes thus formed, the manufacturing cost is increased as much as the holes are formed in the printed circuit board; that is, the resultant brushless motor is increased in manufacturing cost as much.

On the other hand, in the case where the coils are laid outside the wiring board, the coils come outside the wiring board. Hence, the parts of the coils which come outside the wiring board may touch other components such as a rotor, thus being broken. That is, the brushless motor is low in reliability.

SUMMARY OF THE INVENTION

Accordingly, an object of the invention is to provide a brushless motor low in manufacturing cost and high in reliability in which particular members such as terminals are not employed, and the coils are extended to the lower surface of the wiring board with ease, and a method of manufacturing the brushless motor.

There is provided a brushless motor comprising:
A brushless motor comprising:
a stator core having a plurality of radially extended salient poles, and coils of plural phases being wound on said salient poles;
a core holder which has axially extended protrusions, and on which said stator core is mounted;
a stator base board which has cut portions in which said protrusions of said core holder are fitted, the upper surface on which said stator core is held through said core holder and the lower surface on which a wiring pattern is formed to which the end portions of said coils are connected; and
gaps which are formed between the outer surfaces of said protrusions and the inner surfaces of said cut portions when said protrusions are fitted in said cut portions, and allow the end portions of said coils to drawn out from the upper surface of said stator base board to the lower surface. As was described above, when the stator core is mounted through the core holder on the wiring board, the gaps are automatically formed between the grooves formed in the wiring board and the protrusions of the core holder, and the coils are extended through the gaps from the upper surface of the wiring board to the lower surface, and then the terminals of the coils are connected to the wiring board. Accordingly, it is unnecessary to use the terminal members, and the number of components is reduced as much. Furthermore, the terminals of the coils are directly connected to the wiring pattern: that is, the wiring operation can be achieved with ease. Furthermore, it is unnecessary to form particular holes in the wiring board in advance. Hence, the resultant brushless motor is low in manufacturing cost. In addition, the coils are extended through the gaps, and do not stick out of the wiring board. Therefore, the coils will never be broken contacting other motor components. Thus, the brushless motor of the invention is high in reliability.

BRIEF DESCRIPTION OF THE DRAWINGS

FIG. 2 (A) to (C) are a plan view, a side view and a bottom view, respectively, showing stator 30 mounted on a stator base board in the brushless motor of the invention;

DETAILED DESCRIPTION OF THE PREFERRED EMBODIMENTS

A preferred embodiment of the invention will be described with reference to the accompanying drawings.

Figure 1:
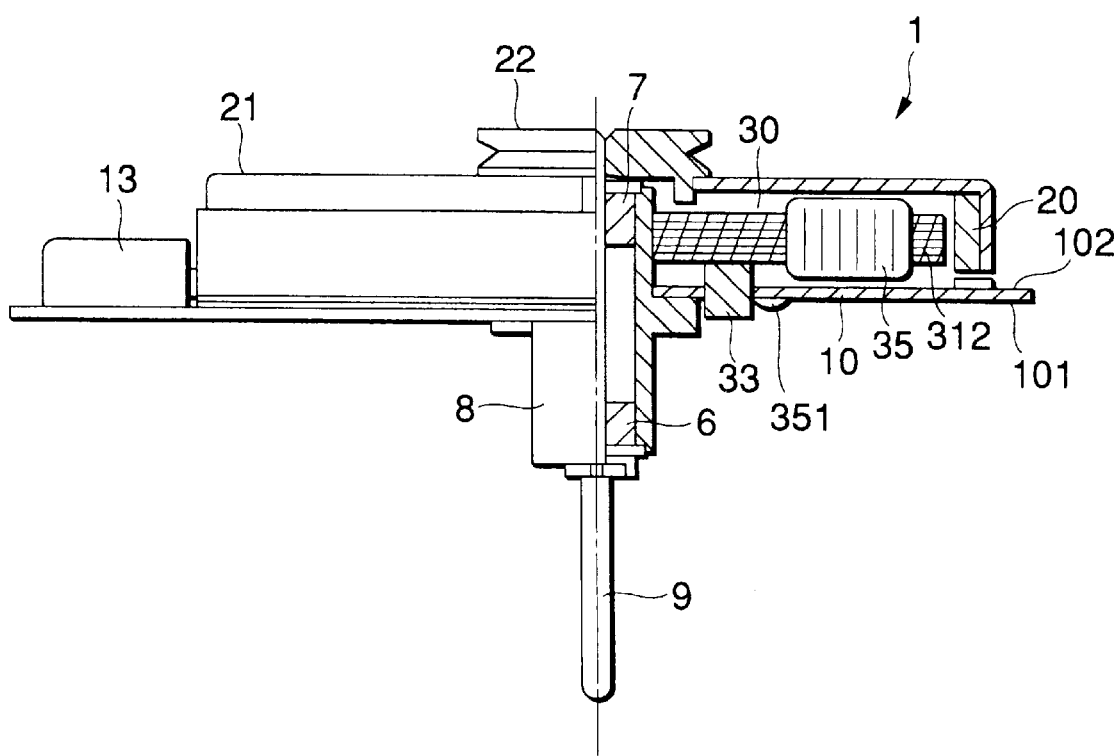
FIG. 1 is a sectional view of a brushless motor, which constitutes a preferred embodiment of the invention.

FIG. 1 is a sectional view of a brushless motor to which the technical concept of the invention is applied. In FIG. 1, the brushless motor 1 has a stator base board 10 of phenol. Substantially cylindrical bearing holder 8 holding two bearings 6 and 7 is mounted on the stator base board 10. A motor shaft 9 is fitted in the bearing holder 8 in such a manner that it is rotatably supported by the bearings 6 and 7. The stator base board 10 has an upper (front) surface 102, on which a stator 30 is mounted in such a manner as to coaxially surround the bearing holder 8. The stator 30 comprises: a stator core having a plurality of salient poles 312 which are extended radially, and coils 35 wound on the poles 312. A ring-shaped drive magnet 20 is arranged in such a manner that it confronts through a small gap with the outer periphery of the stator 30. More specifically, the drive magnet 20 is mounted on the inner cylindrical surface of a cut-shaped motor casing 21 which is provided in such a manner that its opening is confronted with the upper surface 102 of the stator base board. The end portion of the motor shaft 9 is integral with a pulley 22 which is provided at the center of the bottom of the motor casing 21, and the latter 21 is turned together with the motor shaft. The lower end portion of the motor shaft 9 penetrates the state base board 10 downwardly, thus appearing in the lower surface of the latter 10.

In the embodiment, the surface of the stator base board 10 on which the stator 30 is provided, is referred to as "the upper (front) surface), and the surface opposite to the upper surface is referred to as "the lower (rear) surface", when applicable.

Figure 3A:
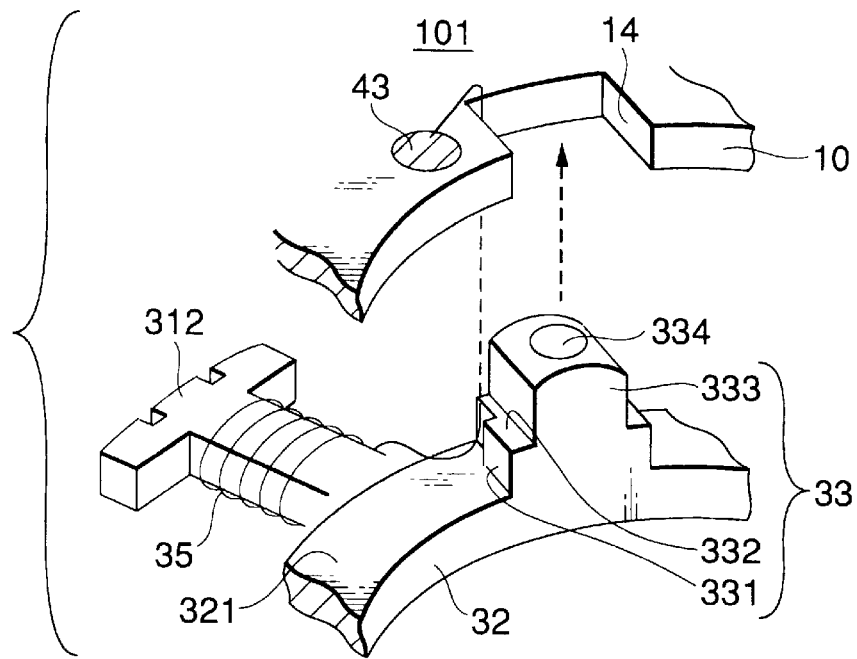
FIG. 3 (A) and (B) are explanatory diagrams, as viewed from the lower surface of the stator base board, for a description of the mounting of the stator of the brushless motor of the invention on a stator base board.
Figure 3B:
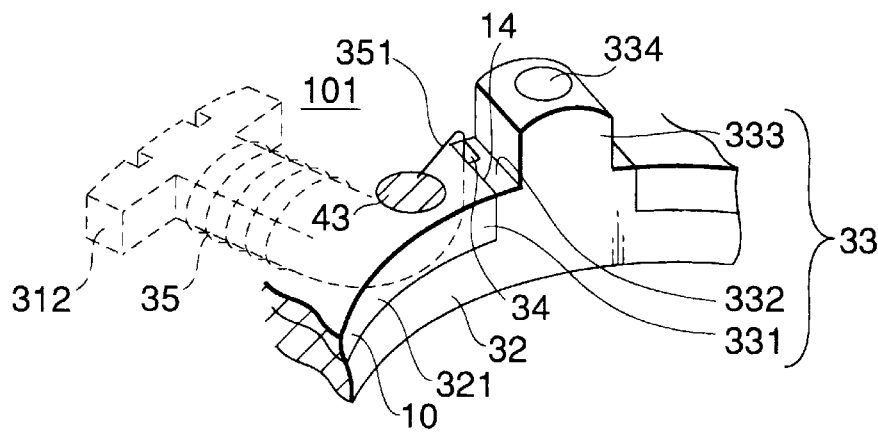

FIG. 2 is an explanatory diagram showing a structure for mounting the stator on the stator base board. FIG. 3 is an enlarged diagram showing a protrusion formed on a core holder and a groove formed in the stator base board, as viewed from the lower surface of the stator base board.

As shown in the parts (A) through (C) of FIG. 2, in the brushless motor 1 of the embodiment, the stator 30 is mounted substantially at the center of the surface 102 of the state base board 10. The stator base board 10 has a mounting hole 10 substantially at the center in which the above-described bearing holder is fitted A predetermined wiring pattern is formed on the lower surface 101 of the stator base board 10, and the latter 10 is employed not only as a motor-component mounting frame but also as a wiring board. Various elements such as a motor driving IC 11, three Hall elements 12 for detecting a position of the motor; a chip capacitor (not shown), and a Zener diode. On the upper surface 102 of the stator base board 10, a signal inputting and outputting connector assembly 13, which is electrically connected to the wiring pattern formed on the lower surface 101 of the connector 13.

In the stator 30, its stator core is forming by laminating a plurality of core plates of silicon steel, and comprises an annular member 311 located at the center, and twelve salient poles 312 which are radially outwardly extended from the outer cylindrical surface of the annular member 311. Coils 35 are wound on the salient poles 312 in a three-phase mode.

The stator core 31 thus formed is held by a core holder 32; that is, it is fixed on the upper surface 02 of the stator base board 10 through the core holder 32. Accordingly, the annular member 311 of the stator core 31 has six holder fitting grooves 313. On the side of the core holder 32, six fitting protrusions 322 are formed. The fitting protrusions 322 are protruded upwardly (in the direction of axis of the motor) so that they are engaged with the holder fitting grooves 313. That is, the fitting protrusions 322 are engaged with the holder fitting grooves 313, so that the stator core 31 is held by the core holder 32. It is preferable that the core holder 32 is made of insulating material such as resin.

The core holder 32 holding the stator core 31 is secured to the stator base board 10 with three screws 30 which are threadably engaged with the stator base board 10 from the lower surface.

In the stator base board 10, three positioning grooves 14 are formed at angular intervals of 120° by cutting in such a manner that they are extended radially from the outer cylindrical surface of the fitting hole 103. In correspondence to the three positioning grooves 14, in the core holder 32 (as shown in FIG. 3, too), three positioning protrusions 33 are formed at angular intervals of 120°. Those protrusions 33 are extended downwardly in the direction of axis of the motor, and are fitted in the aforementioned grooves 14, respectively. Each of the protrusions 33 comprises: a first engaging portion 331 which is extended from the bottom portion 321 of the core holder 32 and has a width which is substantially equal to the width (as viewed in the circumferential direction) of the cut portion 14; a second engaging portion 332 which is extended from the first engaging portion 331 and is slightly smaller in width than the latter 331; and a protruded portion 333 which is extended from the end face of the engaging portions 331 and 332 in the direction of axis of the motor. The sum of the dimensions (measured in the radial direction) of the first and second engaging portions 331 and 332 is substantially equal to the depth of the grooves 14, and the height of the first and second engaging portions is substantially equal to the thickness of the stator base board 10. Each protruded portions 333 has a through-hole 334 which is extended in the direction of axis of the motor. Hence, when, as shown in the part (B) of FIG. 3, the protrusions 33 are engaged with the grooves 14 of the stator base board 10, the outer peripheral surfaces of the first engaging portions 331 are brought into contact with the inner peripheral surfaces of the grooves 14, so that the angular position of the core holder 32 is determined. And the bottom 321 of the core holder 32 is brought into contact with the upper surface 102 of the stator base board 10.

The outer side surfaces of the second engaging protrusions 332 are smaller in width than the grooves 14. Therefore, between the outer side surface of each second engaging protrusion 332 and the inner side surface of the respective cut portion 14, two coil inserting gaps 34 are formed. In the invention, those gaps 34 are utilized to extend the coil ends of the coils 35 over the lower surface 101 of the stator base board 10 which are wound on the stator core 31 on the upper surface of the stator base board 10. That is, in the brushless motor 1 of the invention, the coils 35 provided on the upper surface 102 of the stator base board 10 are inserted into the gaps 34 between the outer side surfaces of the second engaging portions 332 and the inner side surfaces of the grooves 14, and thereafter the coil terminals 351 are soldered to lands of the wiring pattern formed on the lower surface 101 of the stator base board 10.

A step of connecting a coil end 351 to the wiring pattern will be described with reference to FIG. 4. Each coil end has a lead-out portion; however, since all the lead output portions are the same, only one of them will be described.

Figure 4A:
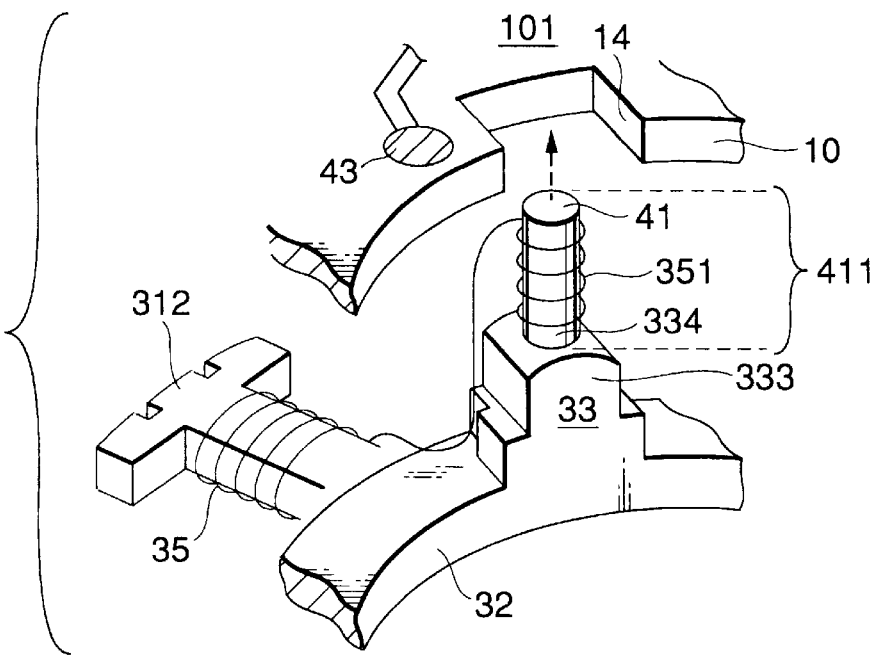
FIG. 4 (A) to (C) are explanatory diagram, as viewed from the lower surface of the stator base board, for a description of a method of manufacturing the brushless motor of the invention.
Figure 4B:
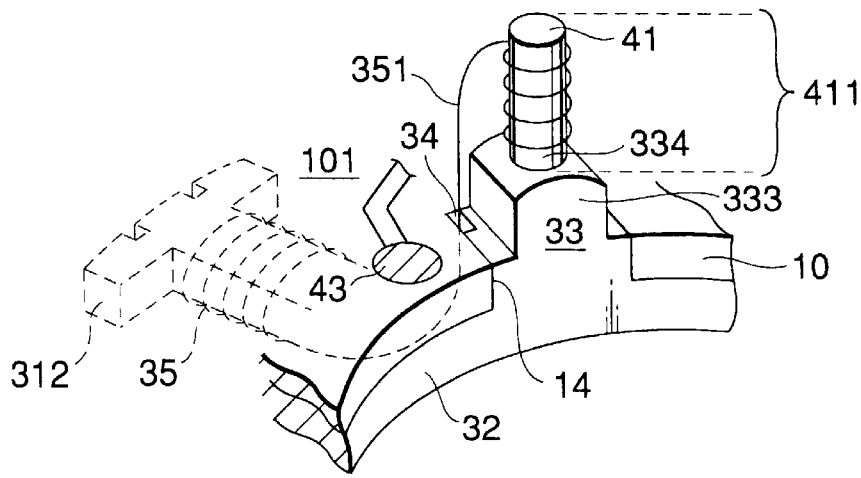
Figure 4C:
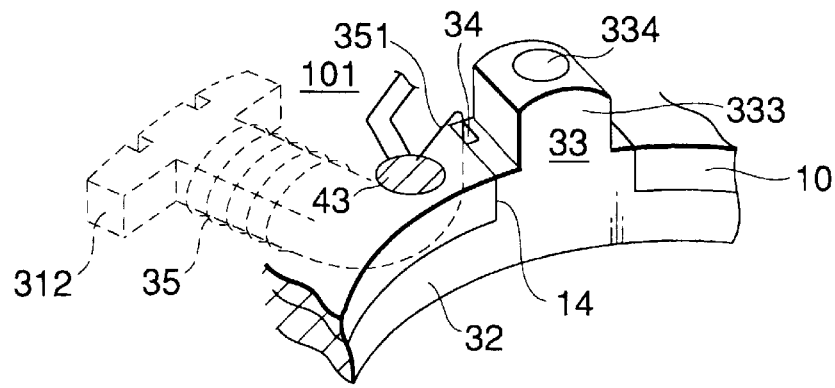

After the stator core 31 and the holder 32 are made integral with each other, as shown in the part (A) of FIG. 4, a lead-out pin 41 is inserted into the through-hole 334 formed into the protruded portion 333 of the protrusion 33 in such a manner that the end portion of the lead-out pin is protruded out of the protruded portion 333.

Next, the end portion 351 of the coil 35 wound on the salient pole 312 is wound on the protruded portion 411 of the lead-out pin 41. In this case, the coil 35 is laid on the outer surface of the second engaging portion 332 of the protrusion.

Next, as shown in the part (B) of FIG. 4, the stator 30 is mounted on the upper surface 102 of the stator base board 10 so that, with the coil ends 351 held on the protruded portion 411 of the lead-out pins 41, the protrusions 33 are inserted into the respective grooves 14. Since the coil end portion 351 is held wound on the lead-out pin 41, the coil end portion 351 is automatically extended through the gap 34 from the upper surface 102 of the stator base board 101 to the lower surface 101. This feature eliminates the troublesome work that, after the stator 30 is mounted on the stator base board 10, the coil end portions 351 are inserted into the gaps 34. That is, the coils 35 can be pulled over the lower surface of the stator base board 10 with ease. After the coils 35 have been set, the coil lead-out pins 41, being unnecessary, are removed from the through-holes 334 of the protruded portions 333.

Next, as shown in the part (C) of FIG. 4, the coil end portion 351 is released from the protruded portion 411 of the lead-out pin 41, and is then soldered to the land 43 of the wiring pattern on the lower surface of the stator base board 10. Thus, the coil 35 is connected to the wiring pattern, and the supply of current to the coil can be controlled by means of the motor driving IC 11.

As was described above, in the brushless motor according to the embodiment, the coil end portions 351 are extended from the upper surface 102 of the stator base board 10 to the lower surface 101 by the utilization of the gaps 34 which, when the stator core 31 is mounted through the core holder 32 on the upper surface 102 of the stator base board, are automatically formed between the protrusions 33 of the core holder 32 and the grooves 14 of the stator base board 10. That is, the coils 35 are laid without use of terminals, and the coil end portions are directly connected to the wiring pattern. This feature decreases the number of components as much, and achieves the wiring operation with ease. In addition, it is unnecessary to form particular holes in the stator base board 10. Therefore, the resultant brushless motor is low in manufacturing cost. Furthermore, since the coils are extended through the gaps 34, the coils thus laid will never be broken contacting other motor components. Thus, the brushless motor of the invention is high in reliability.

While there has been described in connection with the preferred embodiment of the invention, the invention is not limited thereto or thereby; that is, it will be obvious to those skilled in the art that various changes and modifications may be made therein without departing from the invention.

For instance, in the above-described embodiment, with respect to the protrusions 33 of the core holder 32, the through holes 334 are formed through which the protrusions 33 are passed in the direction of axis of the motor; however, it is not always necessary that the protrusions 33 penetrate the holes 334; that is, the holes 334 may be bottomed ones.

Furthermore, in the above-described embodiment, each of the protrusions 33 of the core holder 32 has the first engaging portion 331 whose width is equal to the width (as viewed in the circumferential direction) of the cut portion 14 formed in the stator base board 10, and a second engaging portion 332 whose width is slightly smaller than the width of the first engaging portion 331, and the gap 34 is formed between the side surface of the second engaging portion 332 and the side surface of the groove 124; however, the invention is not limited thereto or thereby. That is, the following modification may be employed: Protrusions which are substantially equal in configuration to the grooves 14 of the stator base board 10, and a vertical groove is formed in the side surface of each of the protrusions. And the gap formed by the vertical groove and the side surface of the cut portion 14 of the stator base board 10 is utilized; that is, the coil 35 is inserted into the gap thus formed so that it is extended from the upper surface of the stator base board 10 to the lower surface. In addition, the following modification may be employed: The stick-out corners of the second engaging portion are rounded, while the sink-in corners of the cut portion 14 are made angular, to form the gaps 34.

Further, in the embodiment described above, the cut portion 14 is communicated with the mounting hole 103. Of course, it is applicable for forming the cut portion 14 and the mounting hole 103, independently. In this case, the cut portion 14 is arranged on a portion defined by a circumference portion with respect to the rotation axis of the motor in accordance with the shape of the core holder.

Moreover, in any of the embodiment and the modified embodiment, a position where the gap 34 is formed is freely provided between the outer circumference portion of the projection 33 and the inner circumference portion of the cut portion 14.

As was described above, when the stator core is mounted through the core holder on the wiring board, the gaps are automatically formed between the grooves formed in the wiring board and the protrusions of the core holder, and the coils are extended through the gaps from the upper surface of the wiring board to the lower surface, and then the terminals of the coils are connected to the wiring board. Accordingly, it is unnecessary to use the terminal members, and the number of components is reduced as much. Furthermore, the terminals of the coils are directly connected to the wiring pattern: that is, the wiring operation can be achieved with ease. Furthermore, it is unnecessary to form particular holes in the wiring board in advance. Hence, the resultant brushless motor is low in manufacturing cost. In addition, the coils are extended through the gaps, and do not stick out of the wiring board. Therefore, the coils will never be broken contacting other motor components. Thus, the brushless motor of the invention is high in reliability.

What is claimed is:

1. A brushless motor comprising:

a stator core having a plurality of radially extended salient poles, and coils of plural phases being wound on said salient poles;

a core holder which has axially extended protrusions, and on which said stator core is mounted;

a stator base board which has cut portions in which said protrusions of said core holder are fitted, said stator base board having an upper surface on which said stator core is held through said core holder and said stator base board having a lower surface on which a wiring pattern is formed to which end portions of said coils are connected; and gaps which are formed between outer surfaces of said protrusions and inner surfaces of said cut portions when said protrusions are fitted in said cut portions, and said gaps allow the end portions of said coils to be drawn out from the upper surface of said stator base board to the lower surface.

2. A brushless motor as claimed in claim 1, wherein said protrusions of said core holder have first engaging portions, said first engaging portions have a first width and said cut portions have a second width, wherein said first width is equal to said second width, and said second engaging portions have a third width, wherein said third width is smaller than said first width.

3. A brushless motor as claimed in claim 1, wherein said protrusions of said core holder have axially extended holes into which lead-out pin are inserted, said lead-out pin serving to extend said coils through said gaps.

* * * * *